(12) United States Patent
Dufour et al.

(10) Patent No.: US 8,558,891 B2
(45) Date of Patent: Oct. 15, 2013

(54) METHOD OF DETECTING AN OBJECT IN A SCENE COMPRISING ARTIFACTS

(75) Inventors: Jean-Yves Dufour, Montigny-le-Bretonneux (FR); Michel Prenat, Boulogne (FR); Nadège Lemperiere, Issy-les-Moulineaux (FR)

(73) Assignee: Thales, Neilly sur Seine (FR)

( * ) Notice: Subject to any disclaimer, the term of this patent is extended or adjusted under 35 U.S.C. 154(b) by 492 days.

(21) Appl. No.: 12/996,597

(22) PCT Filed: Jun. 5, 2009

(86) PCT No.: PCT/EP2009/056908
§ 371 (c)(1),
(2), (4) Date: Dec. 6, 2010

(87) PCT Pub. No.: WO2010/003742
PCT Pub. Date: Jan. 14, 2010

(65) Prior Publication Data
US 2011/0080480 A1    Apr. 7, 2011

(30) Foreign Application Priority Data
Jun. 6, 2008  (FR) ..................... 08 03167

(51) Int. Cl.
*H04N 7/18* (2006.01)
*G02B 26/08* (2006.01)
*G02B 26/10* (2006.01)
*G02B 26/12* (2006.01)
*G01S 13/00* (2006.01)

(52) U.S. Cl.
USPC ............................ 348/143; 359/196.1; 342/90

(58) Field of Classification Search
USPC ....................................................... 348/143
See application file for complete search history.

(56) References Cited

U.S. PATENT DOCUMENTS

| 5,210,798 A | 5/1993 | Ekchian et al. |
| 5,379,044 A | 1/1995 | Carlson et al. |
| 2004/0246548 A1 | 12/2004 | Papuchon et al. |

FOREIGN PATENT DOCUMENTS

| FR | 2875626 A1 | 3/2006 |
| GB | 2330028 A | 4/1999 |
| WO | 89/12371 A1 | 12/1989 |
| WO | 03/029876 A1 | 4/2003 |
| WO | 03/067884 A1 | 8/2003 |

*Primary Examiner* — Christopher S Kelley
*Assistant Examiner* — Hee-Yong Kim
(74) *Attorney, Agent, or Firm* — Baker Hostetler LLP

(57) ABSTRACT

A method for detecting an object in a scene situated in a sector and capable of comprising one or more artifacts, includes a step of scanning the sector at an angular velocity $\theta'$, a step of acquiring digital images of the scene at a rate f by means of a matrix detector, these images comprising pixels and covering an instantaneous field of angular width "a". It comprises the following steps of processing the acquired images, in batches of N consecutive images where $N=af/\theta'$: dividing the N images into P groups of images; for each group p, accumulating the images of the group so as to obtain an accumulated image $I_p$; for each image $I_p$, selecting the pixels that satisfy a determined detection criterion; for each image $I_p$ comprising at least one selected pixel, called the start-of-confirmation image, carrying out a temporal confirmation step which comprises the following substeps: applying a temporal confirmation criterion by comparing with a number K the number k of times that this selected pixel in the starting image has been selected in the subsequent $I_p$ images: this pixel will be considered to be that of an object if $k \geq K$; reiterating this temporal confirmation criterion for all the selected pixels of this starting image.

12 Claims, 3 Drawing Sheets

METHOD OF DETECTING AN OBJECT IN A SCENE COMPRISING ARTIFACTS

CROSS-REFERENCE TO RELATED APPLICATIONS

This application is a National Stage of International patent application PCT/EP2009/056908, filed on Jun. 5, 2009, which claims priority to foreign French patent application No. FR 0803167, filed on Jun. 6, 2008, the disclosures of which are incorporated by reference in their entirety.

FIELD OF THE INVENTION

The invention refers to optronic surveillance systems field.

BACKGROUND

The function of an optronic surveillance system is to detect and follow targets entering a surveillance zone.

The crucial problem of detecting a target (or object) in a video sequence is to find a criterion designated the "detection criterion" which makes it possible to decide, for each image comprising pixels, which are the pixels of a target. The choice of this criterion leads to detection performance defined as a function of the probability of detection—probability of false alarm pair.

Note that the probability of detection is the probability for a pixel of a target (or of a threatening object) to be declared a target; the probability of false alarm is the probability for a pixel of a non-threatening object to be declared a target.

In surveillance systems for airborne targets, images acquired in the infrared wavelengths are generally used. They they provide a good detection criterion since most of the targets are propelled and therefore supply a high IR signal.

For a long-range air to air surveillance system, detection consists in distinguishing, with a high probability of detection and a low probability of false alarm, a pixel that can exhibit a low signal-to-noise ratio (SNR,), that is a pixel which signal is weak compared to the signals of its background pixels.

The main sources of false alarms are:
  noise samples on the background pixels of the target which produce an additional signal that is comparable in certain cases with that of a target,
  artifacts varying rapidly in the background which produce a very strong signal (reflections of the sun on the edge of the clouds for example).

The systems considered are more particularly the low-frequency scanning surveillance systems operating with a high-frequency acquisition device.

FIG. 1 illustrates an example of a known surveillance system comprising scanning means making it possible to analyze preferably repetitively a sector S of space. This system comprises an "a×b" instantaneous-field front optical system 1 and scanning means 2 allowing the sector S to be observed with a given "A×B" total field. The scanning means are controlled by a processing unit allowing the sector to be scanned. The surveillance system also comprises means for forming an image 3 on the pixels of the matrix detector 41 included in the detection means 4. This involves the image of a scene situated in a given "a×b" field zone, situated in the sector S. The system may also comprise backscanning means 6 making it possible to compensate for the movements of the image due to the scanning of the scene during the acquisition of the images. For example, the processing unit 5 can synchronize the acquisition of the images with the scanning by backscanning means.

On these systems, the matrix detector 41 covers a band of space (which dimension is "a×b") by rotation of the scanning means 2. In this case, a point of the sector S is not observed permanently, but over a period which duration depends on the time spent to return to this point after having scanned the whole of the sector S. Backscanning means 6 make it possible, on the one hand, to ensure the stability of the line of view during the integration time of the matrix detector 41 for each image, and, on the other hand, to observe the same "a×b" zone of space (with a dimension substantially equal to the instantaneous field of the matrix detector 41, or possibly less than the latter) so long as the means 2 for scanning the sector do not require the move to the next zone. Usually, the scanning/backscanning means 2, 6 provide a certain overlap between two consecutive observed zones in order to eliminate the risk of forming 'blind' zones due to errors in the mechanisms, and in order to handle without additional difficulty the case of targets which move in the reference frame of the matrix detector.

Depending on the frequency of acquisition of the images and the velocity of rotation of the scanning means, a certain number of images of the same zone is therefore obtained (with the same direction of view).

These surveillance systems are characterized by:
  a significant delay (which may be as long as several seconds) between two consecutive observations of the same zone when there are two successive analyses of the sector S,
  a large number N (of the order of several tens) of acquisitions of images of the same object (or target) of a scene on each scan: N consecutive images then include the same object.

This method has been illustrated in FIG. 2 with the following values:
  The sector S of a field represented by an angle A×B is scanned over its width A in T seconds, namely at an angular velocity $\theta'$, for example 20° in 2 s, namely $\theta'=A/T=10° \text{ s}^{-1}$.

Let a be the angular width of the instantaneous field of the matrix detector; the time dedicated to the acquisition of the images of a scene covering an angular width "a" is equal to the time necessary to scan this width at the angular velocity $\theta'$, namely $t=a/\theta'$, for example for $a=1°$ and $\theta'=10° \text{ s}^{-1}$, $t=0.1$ s.

The term "angular width" is not limited to an orientation in space.

Let f be the sampling rate of the matrix detector (image rate), for example f=400 Hz, namely a sampling period $t_e=1/f=2.5$ ms.

Then the number N of images dedicated to this same angular zone is equal to $N=t/t_e=a \cdot f/\theta'$, namely N=40.

In the figure, and in order not to overload it, a point object O is therefore present in 40 consecutive images, numbered from n to n+39. This object is not present in the previous 40 images (numbered from n−40 to n−1) or in the next 40 images (numbered from n+40 to n+79).

The problem is to optimize the use of these N images in order to detect the object with a high probability of detection and to as much as possible eliminate false alarms due notably to artifacts.

SUMMARY OF THE INVENTION

The subject of the invention is a method for detecting an object in a scene situated in a determined angular sector S, and capable of comprising one or more artifacts (background signals of a great amplitude and varying rapidly), which method comprises a step of scanning the sector in its angular width A at an angular velocity θ', a step of acquiring consecutive digital images of the scene at a frequency f, these images comprising pixels and covering an 'instantaneous' field of angular width "a". It is mainly characterized in that it comprises the following steps of processing the acquired images, in batches of N images where N=af/θ':

- dividing the N images into P groups of images, P being an integer greater than 1,
- for each group p, p being between 1 and P, accumulating the images of the group so as to obtain an accumulated image $I_p$ including the object pixel,
- for each image $I_p$, selecting the pixels which satisfy a determined detection criterion,
- for each image $I_p$ comprising at least one selected pixel, called the start-of-confirmation image, carrying out a temporal confirmation step which comprises the following substeps:
  - applying a temporal confirmation criterion by comparing to a predetermined number K, where K<=P, the number k of times that this selected pixel in the starting image or one of its adjacent pixels has been selected in the subsequent $I_p$ images, the selected pixel in the starting image being counted in k: this pixel will be considered to be that of an object if k≥K,
  - reiterating this temporal confirmation criterion for all the pixels selected in this starting image as far as those pixels have not already been taken into account in a calculation of k.

This method makes it possible:

- to take account, in the temporal confirmation criterion, of the potential movement of the object in selected adjacent pixels, this movement being due to the angular movement of the target in the reference axes of the sensor and during the acquisition time of the N images,
- to increase the performance in eliminating the artifacts because, on the one hand, the latter do not have more weight than the targets during the application of the temporal confirmation criterion and, on the other hand, since the targets have a greater temporal correlation than that of the artifacts, the application of the criterion eliminates the artifacts without weakening the detection of the targets.

Through the temporal confirmation criterion, the method also makes it possible to reject the targets which angular movement is too rapid, such as, for example, an object which does not constitute a threat and which can be detected only at a short distance, such as a bird. Specifically, the number of images of each group is determined so that the object pixel does not exhibit a pixel change between the images of the group.

More precisely, according to one feature of the invention, the number of images of each group p is determined as a function of the supposed angular velocity of the target, of the size $\theta_p$ of the viewing angle of the pixel and of the image rate f and optionally as a function of N.

K is typically determined as a function of the supposed duration of presence of the artifacts and of the image rate f.

According to one feature of the invention, P is determined as a function of N and of the number of images of each group.

Preferably, a pixel is selected when SNR>predetermined threshold in this pixel.

According to another feature of the invention, an adjacent pixel is determined as a function of the acceptable movements of the object, from one image $I_p$ to the other, and/or as a function of an acceptable trajectory of pixels.

When the image of an object covers more than one pixel, the method comprises, before the step of dividing the N images into P groups, a step of changing the scale of the pixels, that is to say that a block of q×q old pixels becomes a new pixel, q being an integer greater than or equal to 2, so that the image of an object covers only one pixel.

The angular velocity θ' is not necessarily constant.

A further subject of the invention is a system for the surveillance of a sector S which comprises:

- means for scanning the sector S the angular width A of which is scanned at an angular velocity θ',
- means for forming images of scenes situated in said sector S and capable of comprising artifacts,
- means for detecting digital images of a scene, at a rate f comprising a matrix detector having a set of pixels,
- a unit for processing the detected images,
- characterized in that the processing unit comprises means for applying the method as described.

BRIEF DESCRIPTION OF THE DRAWINGS

Other features and advantages of the invention will appear on reading the following detailed description given as a non-limiting example and with reference to the appended drawings in which.

From one figure to the next, the same elements are indicated by the same references.

DETAILED DESCRIPTION

First of all, the problem posed by artifacts will be analyzed in greater detail.

For an acquired image, the signal is expressed in the following manner depending on whether a target is present or not in the corresponding pixel and in the case of the presence of an ephemeral artifact.

$$S_{threat} = S_{target} + S_{background} + S_{noise}$$

$$S_{no\ threat} = S_{background} + S_{noise}$$

$$S_{quick\_clutter} = S_{artifact} + S_{background} + S_{noise}$$

where $S_{target}$ is the signal of the target,
$S_{background}$ the signal of the background of the pixel
$S_{noise}$ a random sample of the noise of the sensor,
$S_{artifact}$ the signal of the artifact which appears only in a few consecutive images,
$S_{quick-clutter}$ the noisy signal of the artifact.

$$S_{artifact} >> S_{target} \text{ and } S_{artifact} >> S_{noise}$$

A subsequent tracking is based on a temporal association of the targets detected on each scan of the sector. Because of the delay, which may be significant, between two consecutive observations of the same zone during two successive analyses of the sector S, a moving object has, from one image (in fact from a group of accumulated images) to the other, an angular movement which may be significant and which therefore requires a wide zone of search in order to achieve the temporal association, which increases the risks of ambiguous association.

The problem is therefore to optimize the use of the N temporally close images in order to detect the target with a high probability of detection and to eliminate false alarms as much as possible in order to reduce the probability of incorrect associations for the purpose of a subsequent tracking.

Remember that N=af/θ'. According to the invention, the angular velocity θ' is not necessarily constant.

The accumulation of the N images would make it possible to increase the S/N. For a fixed target, the mean intensity of a pixel originating from this accumulation followed by a division by N is given by the equations:

$$S_{threat\_acc} = S_{target} + S_{background} + S_{noise\_acc}$$

$$S_{no\_threat\_acc} = S_{background} + S_{noise\_acc}$$

$$S_{quick\_clutter\_acc} = \frac{S_{artifact}}{N} + S_{background} + S_{noise\_acc}$$

if the artifact is present in only one image and where $S_{noise\_acc}$ is a noise which has a standard deviation equal to $$\frac{\sigma}{\sqrt{N}},$$

where σ is the standard deviation of the noise for a given image.

This solution optimizes the elimination of false alarms due to noise. Nevertheless, in the case of a moving target which can change pixels during the acquisition of N images, the resultant signal can become diluted between adjacent pixels. The noise is reduced but that of the target is also reduced while the background signal does not change. For example, for a target which changes pixel on each image, this gives:

$$S_{moving-target\_acc} = \frac{S_{target}}{N} + S_{background} + S_{noise\_acc}$$

Figure 3:
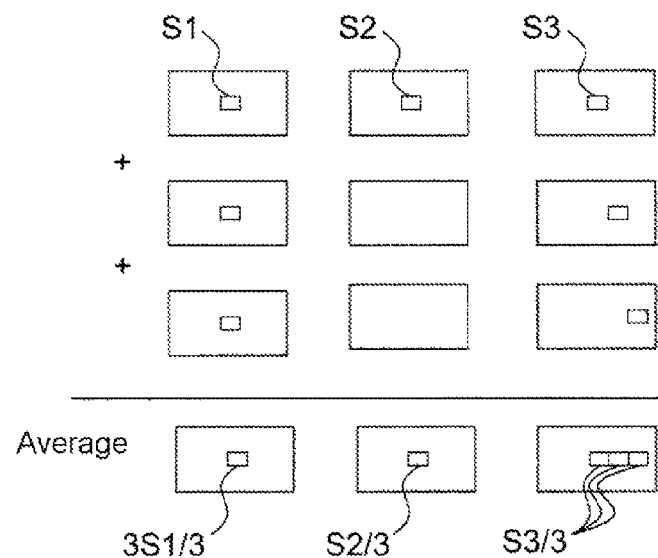
FIG. 3 illustrates the problem posed by artifacts.

This will be explained in detail on an example illustrated in FIG. 3 considering 3 different cases, one case per column. The first 3 lines correspond to consecutive moments, the last representing the mean computed on these 3 considered moments. Each image I of this table results from an accumulation of Q images. This gives for the mean image:

the fixed target (1st column): 3 $S_1/3=S_1$,
the artifact (2nd column): $S_2/3$,
the slow-moving target (3rd column): $S_3/3, S_3/3, S_3/3$.

Moreover, the high artifacts which occur occasionally in a single image can result in an accumulated signal that is greater than that of a target that does not move very much. In other words, $$\frac{S_{artifact}}{N}$$

can be greater than $S_{target}$, namely in our example $S_2/3 >> S_1$.

A known solution for solving this moving-target problem consists in applying the "track before detect" method. For each pixel, M trajectory assumptions are made. For each of these assumptions, the positions of the target deduced over time are accumulated. The selected assumption is the trajectory assumption which maximizes the accumulated signal.

This solution effectively deals with the problem of a target moving: the same accumulated signal is obtained as that which would be obtained for a fixed target. But each trajectory assumption can lead to a false alarm on background pixels by accumulation of noise samples: the resultant probability of false alarm is then greater than the probability of false alarm that would have been obtained using the conventional image-accumulation method. Moreover, as indicated above, the high artifacts which occur occasionally in a single image can result in an accumulated signal that is greater than that of a target that does not move very much. In other words, $$\frac{S_{artifact}}{N}$$

may be greater than $S_{target}$, namely in our example $S_2/3 >> S_1$.

Figure 1:
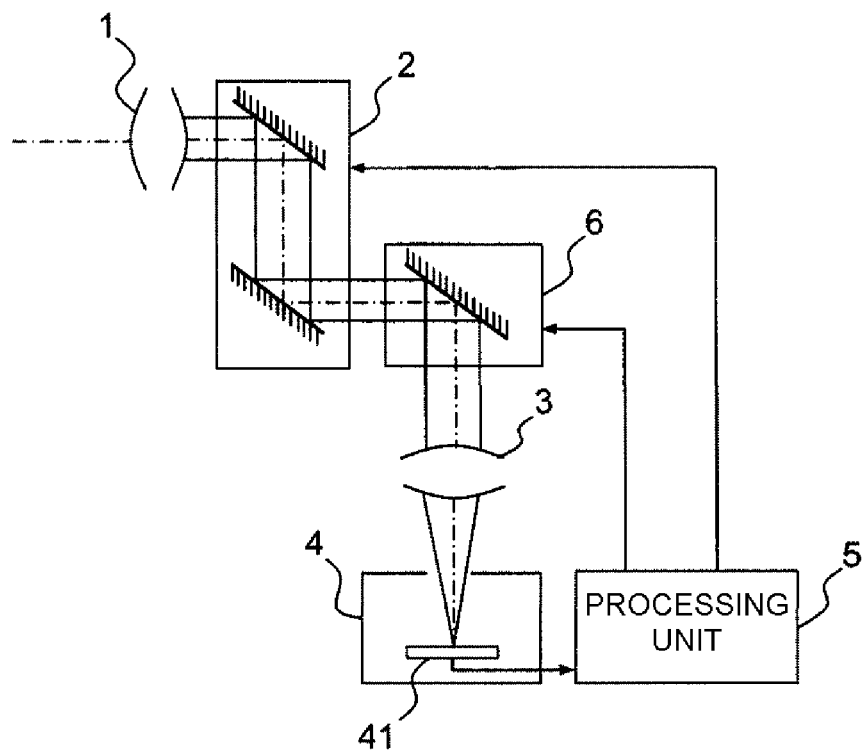
FIG. 1, already described, represents schematically a surveillance system according to the prior art, FIG. 2, already described, illustrates a surveillance method with low-frequency scanning with a high-frequency acquisition, according to the prior art.
Figure 4:
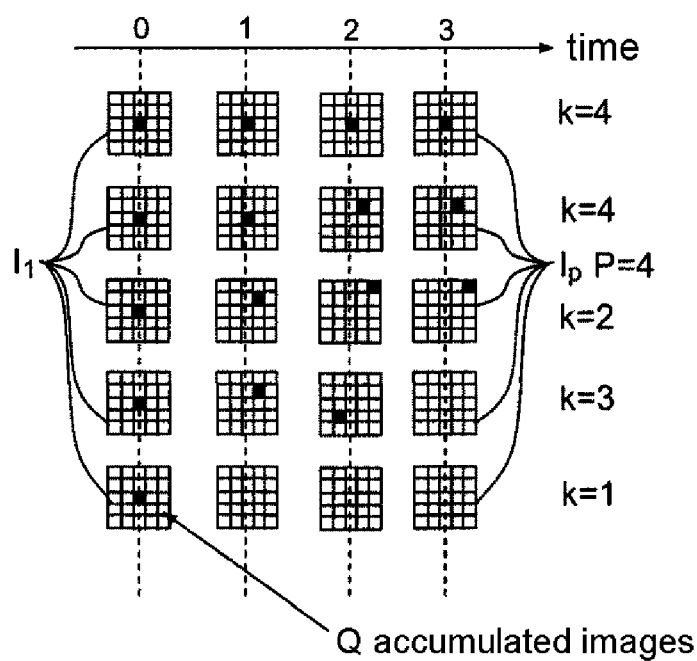
FIG. 4 illustrates examples of calculating k.
Figure 2:
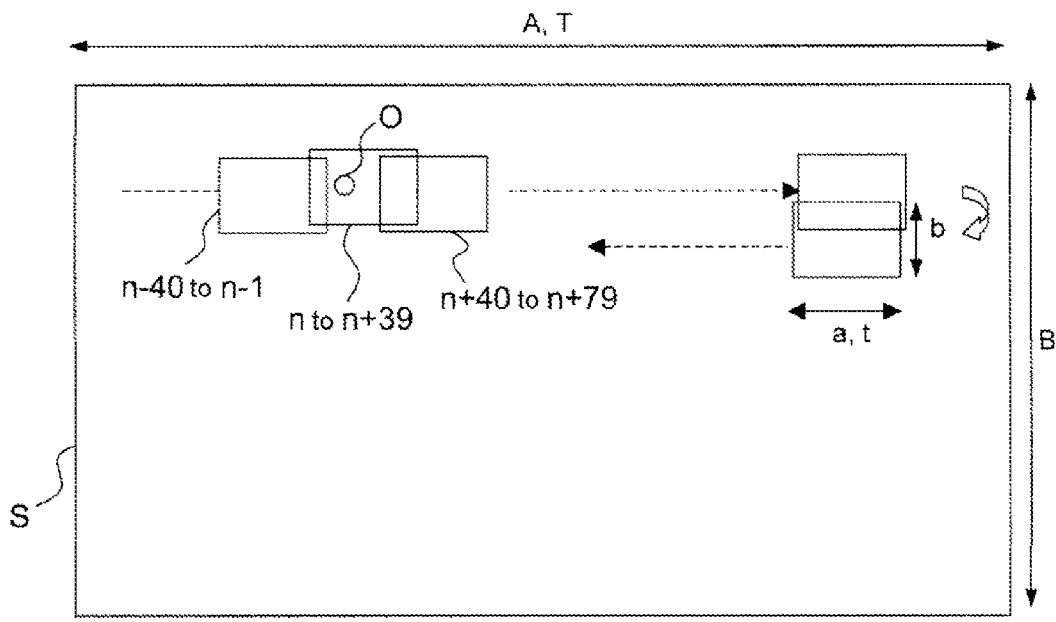
Figure 5:
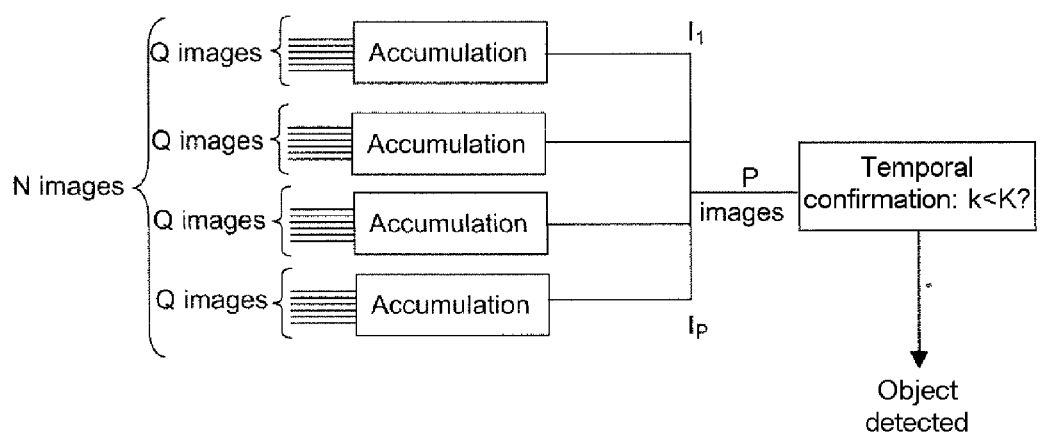
FIG. 5 illustrates various steps of an example of the running of the method according to the invention.

The method according to the invention described with reference to FIGS. 4 and 5 is based on a division of the N images into P groups of images.

The number Q of images per group is determined so that the target exhibits no change of pixel between the Q images. The P groups of images are then used in the following manner:

for each group, accumulating the Q images so as to obtain an accumulated image $I_1, \ldots, I_p, \ldots, I_P$, for each image $I_p$, selecting the pixels which satisfy a determined detection criterion; this criterion may be such that a pixel is selected when the SNR in this pixel is greater than a predetermined threshold (this is the SNR which can be accessed, which is usually an estimated SNR), or such that the signal of the pixel is greater than another predetermined threshold, for each image $I_p$ comprising at least one selected pixel, called the start-of-confirmation image, carrying out a temporal confirmation step which comprises the following substeps:

applying a temporal confirmation criterion by comparing with a predetermined number K (where K<=P) the number k of times that this selected pixel in the starting image or one of its adjacent pixels has been selected in the subsequent $I_p$ images, the selected pixel in the starting image being counted in k: this pixel will be considered to be that of an object if k≥K, reiterating this temporal confirmation criterion for all the selected pixels of this starting image as far as those pixels have not already been taken into account in a calculation of k.

As indicated above, Q is determined so that the target exhibits no change of pixel between the Q images.

The variables Q and K are determined in the following manner:

Q is determined so that the object pixel exhibits no change of pixel between the Q images. More precisely, Q is determined as a function of the supposed angular velocity of the target, of the size of the pixel in angle and of the image rate. If the matrix detector comprises C columns and L lines, the size $\theta_p$ of the angle of view of the pixel is equal to:

(a/C)×(b/L).

Precisely, if $\omega'_c$ is the angular velocity of travel of the target, $\theta_p$ the angular size of a pixel and $t_e$ the image period, this must give:

$\omega'_c \times Q \times t_e \leq \theta_p$.

To give orders of magnitude, if the target is at a distance of 100 kilometers and moves at 300 ms$^{-1}$ perpendicularly to the sensor-target line, the angular velocity of movement is $\omega'_c=3.10^{-3}$ rad s$^{-1}$; if the pixel has an angular size $\theta_p=35$ µrad and if $t_e=2.5$ ms (image rate of 400 Hz), then $Q \leq 4.67$; it is therefore possible to take $Q=4$.

This gives P=N/Q. If N/Q is not an integer, take P=E(N/Q)+1 where E designates the integer portion, accepting that the last accumulated image results from an accumulation on a number of images smaller than Q, which can be taken into account in the determination of the detection threshold. For example, if N=40 and Q=6, take P=7, and we will have 6 images $I_p$ the results of an accumulation on Q=6 elementary images and of an image $I_p$ the result of an accumulation on Q=4 elementary images.

K is determined as a function of the supposed duration of presence of the artifacts and of the image rate multiplied by Q. For example, if Q=4 and $t_e=2.5$ ms, the duration of each group of images is 10 ms (this is the time necessary to obtain an accumulated image), and therefore P=10. If the maximum duration considered for the presence of an artifact is less than 10 ms, take K=2, specifically in this case k cannot exceed 1 for an artifact. If the maximum duration is less than 20 ms, take K=3, etc.

The set of adjacent pixels determined during a phase called the association phase is for example defined by taking into account the acceptable movement of the target in the P groups of images. This involves determining from the selected pixel in the first group of images $I_p$ in which the temporal confirmation step is carried out, which are the 'adjacent candidate' pixels for the next groups of images $I_p$.

For example, based on the same orders of magnitude as those that have been defined above (sensor-target distance=100 km, speed of the target=300 ms$^{-1}$ perpendicularly to the sensor-target line, angular size of the pixel $\theta_p=35$ µrad, $t_e=2.5$ ms), it was seen that the target was likely to move by 1 pixel for each group of images $I_p$, in fact slightly less because Q was taken to be equal to 4 (which is the integer portion of 4.67).

In this situation, we proceed in the following iterative manner: around the selected pixel in the first group of images $I_p$, a square zone Z of 3×3 pixels is selected since it is known that the target can move by one pixel in each group of images and since its angular direction is not known a priori. If, in the next group of images, a pixel of Z has been selected by the detection process, this pixel will be chosen for the rest; otherwise, the zone Z can be enlarged (size 5×5) for the next group of images and so on to the end of the P groups of images. Each time a selected pixel is chosen, it is taken as the new center of the zones to be defined subsequently.

The method described for defining the set of adjacent pixels is one exemplary embodiment. Other embodiments are possible, either simpler (a priori selection of a zone Z that is large enough around the selected pixel in the first group of images, a zone valid for the totality of the P groups of images), or more sophisticated, making it possible to deal with the cases in which two targets interfere in the same neighbourhoods.

The temporal confirmation criterion may be supplemented by a complementary step which consists in deciding whether the set of adjacent pixels thus defined corresponds to an object the movement of which in the P groups of images conforms to what is expected of a target.

For this complementary step, a 'trajectory' criterion for example is applied to the set of pixels chosen during the association phase. Specifically, the latter may lead to an aberrant trajectory of the sudden change type in the direction of angular movement of the target, corresponding to an acceleration which cannot be that of a target. The applicable criterion is for example that the trajectory of the chosen pixels be sufficiently close to a straight line.

This method makes it possible:
to take account, in the temporal confirmation criterion, of the potential movement of the target in selected adjacent pixels,
to increase the performance of elimination of the artifacts because, on the one hand, the latter have no more weight than the targets during the application of the temporal confirmation criterion and, on the other hand, the targets having a temporal correlation that is greater than that of the artifacts, the application of the criterion eliminates the artifacts without weakening the detection of the targets.

Through the temporal confirmation criterion, the method also makes it possible to reject the targets the angular movement of which is too rapid. Specifically, Q is determined such that the target exhibits no change of pixel between the Q images, as indicated above.

An example of a temporal confirmation criterion is illustrated in FIG. 4 considering 3 different cases, one case per line of the table. Each image I of this table results in an accumulation of Q images. There are P groups of accumulated images, one group per column of the table; in this example, P=4. The decision is taken in this example to choose only the targets that are not likely to move by more than 1 pixel in P groups of images, relative to the position of the target in the first group of images in which it is detected; this is reflected in the figure by a search zone materialized by a square which covers a pixel and its adjacent pixels. In this example, the search zone has a size equal to 3×3.

The number k of times that a pixel or one of its adjacent pixels is extracted from the P groups of images is:
k=4 for the fixed target (1st line),
k=4 for the slow-moving target (2nd line),
k=2 for the fast-moving target (3rd line),
k=3 for the erratically-moving target (4th line),
k=1 for the artifact (5th line).

The temporal confirmation criterion consists in determining a value for K, in this instance K=3, and in eliminating the images for which k<K, in this instance the case of the target that moves too much for which k=2 and that of the artifact for which k=1.

The various steps of the detection method are shown in FIG. 5 where Q=6 and P=4.

The invention described hitherto detects targets which occupy only one pixel. A possible adaptation of the invention makes it possible to detect the targets of greater size than the pixel, by averaging by blocks of the image (called 'new pixels') until reducing the targets that it is desired to detect to occupy only one new pixel.

If, for example, only the maximum size of the targets to be detected is known, it is therefore possible to analyze consecutively images averaged in blocks 2×2, 3×3, etc. up to p×p, which amounts to "zooming out" of the image, that is to say to changing the scale of the reference frame O,x,y of the image: a block of q×q old pixels becomes one new pixel, q being an integer greater than or equal to 2 and being able to go up to the number p which corresponds to the maximum size of the targets to be detected. This step occurs before dividing the images into Q groups of images.

The method described is typically applied in a system for the surveillance of a sector S which comprises:
means 2 for scanning the sector S the angular width A of which is scanned at an angular velocity $\theta'$,
means 3 for forming images of scenes situated in said sector S and capable of comprising artifacts, means 4 for detecting digital images of a scene, at a rate f comprising a matrix detector 41 having a set of pixels, a unit 5 for processing the detected images which comprises means for applying the method described.

These application means are conventionally software means.

The invention claimed is:

1. A method for detecting an object in a scene situated in a determined angular sector, and capable of comprising one or more artifacts, comprises a step of scanning the sector the angular width A of which is scanned at an angular velocity θ', a step of acquiring digital images of the scene at a rate f by means of a matrix detector, these images comprising pixels and covering an instantaneous field of angular width "a", and further comprising the following steps of processing the acquired images, in batches of N consecutive images where N=af/θ':

dividing the N images into P groups of images, P being an integer greater than 1, for each group p, p being between 1 and P, accumulating the images of the group so as to obtain an accumulated image $I_p$, for each image $I_p$, selecting the pixels which satisfy a determined detection criterion, for each image $I_p$ comprising at least one selected pixel, called the start-of-confirmation image, carrying out a temporal confirmation step which comprises the following substeps:

applying a temporal confirmation criterion by comparing to a predetermined number K (where K<=P) the number k of times that this selected pixel in the starting image or one of its adjacent pixels has been selected in the subsequent $I_p$ images, the selected pixel in the starting image being counted in k: this pixel will be considered to be that of an object if k≥K, reiterating this temporal confirmation criterion for all the pixels selected in this starting image as far as those pixels have not already been taken into account in a calculation of k.

2. The method as claimed in claim 1, wherein the number of images of each group p is determined as a function of the supposed angular velocity of the object, of the size of the viewing angle of the pixel and of the image rate f of the detector.

3. The method as claimed in claim 2, wherein the number of images of each group p is also determined as a function of N.

4. The method as claimed in claim 1, wherein P is determined as a function of N and of the number of images of each group.

5. The method as claimed in claim 1, wherein K is determined as a function of the supposed duration of presence of the artifacts and of the image rate f.

6. The method as claimed in claim 1, wherein a pixel is selected when SNR>predetermined threshold.

7. The method as claimed in claim 1, wherein a pixel is selected when the signal of the pixel is greater than a predetermined threshold.

8. The method as claimed in claim 1, wherein an adjacent pixel is determined as a function of the acceptable movements of the object, from one image $I_p$ to the other.

9. The method as claimed in claim 1, wherein an adjacent pixel is determined as a function of an acceptable trajectory of pixels.

10. The method as claimed in claim 1, wherein, when the image of an object covers more than one pixel, it comprises, before the step of dividing the N images into P groups, a step of changing the scale of the pixels, that is to say that a block of q×q old pixels becomes a new pixel, q being an integer greater than or equal to 2, so that the image of an object covers only one pixel.

11. The method as claimed in one of the preceding claims, wherein the angular velocity θ' is constant.

12. A system for the surveillance of a sector S which comprises:

means for scanning the sector S the angular width A of which is scanned at an angular velocity θ', means for forming images of scenes situated in said sector S and capable of comprising artifacts, means for detecting digital images of a scene, at a rate f comprising a matrix detector having a set of pixels, a unit for processing the detected images, wherein the processing unit comprises means for applying the method as claimed in claim 1.

* * * * *